United States Patent
Colascione et al.

(10) Patent No.: US 12,405,675 B2
(45) Date of Patent: Sep. 2, 2025

(54) STEERABLE CAMERA FOR AR HAND TRACKING

(71) Applicant: Snap Inc., Santa Monica, CA (US)

(72) Inventors: Daniel Colascione, Melbourne Beach, FL (US); Patrick Timothy McSweeney Simons, Downey, CA (US); Weston Welge, Boulder, CO (US); Ramzi Zahreddine, Denver, CO (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/829,090

(22) Filed: Sep. 9, 2024

(65) Prior Publication Data
US 2024/0427427 A1 Dec. 26, 2024

Related U.S. Application Data

(63) Continuation of application No. 18/357,607, filed on Jul. 24, 2023, now Pat. No. 12,105,891, which is a continuation of application No. 17/950,825, filed on Sep. 22, 2022, now Pat. No. 11,747,912.

(51) Int. Cl.
*G06F 3/01* (2006.01)
*G02B 27/01* (2006.01)
*G06T 19/00* (2011.01)

(52) U.S. Cl.
CPC .......... *G06F 3/017* (2013.01); *G02B 27/017* (2013.01); *G06F 3/011* (2013.01); *G06T 19/006* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 7,971,156 B2 | 6/2011 | Albertson et al. |
| 7,996,793 B2 | 8/2011 | Latta et al. |
| 8,487,938 B2 | 7/2013 | Latta et al. |
| 8,856,691 B2 | 10/2014 | Geisner et al. |
| 9,225,897 B1 | 12/2015 | Sehn et al. |
| 9,230,160 B1 | 1/2016 | Kanter |

(Continued)

FOREIGN PATENT DOCUMENTS

| | | | |
|---|---|---|---|
| CN | 105550655 A | 5/2016 |
| CN | 103049761 B | 8/2016 |

(Continued)

OTHER PUBLICATIONS

"U.S. Appl. No. 17/950,825, Notice of Allowance mailed Mar. 29, 2023", 8 pgs.

(Continued)

*Primary Examiner* — Stephen T. Reed
(74) *Attorney, Agent, or Firm* — Schwegman Lundberg & Woessner, P.A.

(57) ABSTRACT

A system for hand tracking for an Augmented Reality (AR) system. The AR system uses a camera of the AR system to capture tracking video frame data of a hand of a user of the AR system. The AR system generates a skeletal model based on the tracking video frame data and determines a location of the hand of the user based on the skeletal model. The AR system causes a steerable camera of the AR system to focus on the hand of the user.

17 Claims, 11 Drawing Sheets

(56) References Cited

U.S. PATENT DOCUMENTS

| | | |
|---|---|---|
| 9,276,886 B1 | 3/2016 | Samaranayake |
| 9,705,831 B2 | 7/2017 | Spiegel |
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |
| 10,614,855 B2 | 4/2020 | Huang |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,531,402 B1 | 12/2022 | Stolzenberg |
| 11,546,505 B2 | 1/2023 | Canberk |
| 11,747,912 B1 * | 9/2023 | Colascione ............ G06V 20/20 345/156 |
| 2009/0012788 A1 | 1/2009 | Gilbert et al. |
| 2011/0301934 A1 | 12/2011 | Tardif |
| 2014/0059365 A1 * | 2/2014 | Heo ................... G06F 1/3215 713/320 |
| 2014/0118257 A1 * | 5/2014 | Baldwin ............... G06F 3/017 345/158 |
| 2014/0171036 A1 | 6/2014 | Simmons |
| 2015/0120293 A1 | 4/2015 | Wohlert et al. |
| 2015/0370320 A1 | 12/2015 | Connor |
| 2016/0357263 A1 * | 12/2016 | Antoniac ............. G06V 10/75 |
| 2017/0123487 A1 | 5/2017 | Hazra et al. |
| 2017/0277684 A1 | 9/2017 | Dharmarajan Mary |
| 2017/0277685 A1 | 9/2017 | Takumi |
| 2017/0351910 A1 | 12/2017 | Elwazer et al. |
| 2018/0075659 A1 | 3/2018 | Browy et al. |
| 2018/0158370 A1 | 6/2018 | Pryor |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0326781 A1 | 10/2022 | Hwang et al. |
| 2022/0334649 A1 | 10/2022 | Hwang et al. |
| 2024/0103631 A1 | 3/2024 | Colascione et al. |

FOREIGN PATENT DOCUMENTS

| | | |
|---|---|---|
| EP | 3707693 A1 | 9/2020 |
| KR | 20220158824 A | 12/2022 |
| WO | WO-2016168591 A1 | 10/2016 |
| WO | WO-2019094618 A1 | 5/2019 |
| WO | WO-2021221341 A1 | 11/2021 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |
| WO | WO-2024064130 A1 | 3/2024 |

OTHER PUBLICATIONS

"U.S. Appl. No. 18/357,607, Notice of Allowance mailed Feb. 28, 2024", 15 pgs.

"U.S. Appl. No. 18/357,607, Notice of Allowance mailed May 29, 2024", 13 pgs.

"International Application Serial No. PCT/US2023/033134, International Search Report mailed Nov. 23, 2023", 4 pgs.

"International Application Serial No. PCT/US2023/033134, Written Opinion mailed Nov. 23, 2023", 8 pgs.

\* cited by examiner

STEERABLE CAMERA FOR AR HAND TRACKING

CLAIM OF PRIORITY

This application is a continuation of U.S. patent application Ser. No. 18/357,607, filed on Jul. 24, 2023, which is a continuation of U.S. patent application Ser. No. 17/950,825, filed on Sep. 22, 2022, which are incorporated herein by reference in their entireties.

TECHNICAL FIELD

The present disclosure relates generally to user interfaces and more particularly to user interfaces used in augmented and virtual reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." In a hybrid form, a view of the surrounding environment is captured using cameras, and then that view is displayed along with augmentation to the user on displays the occlude the user's eyes. As used herein, the term AR refers to augmented reality, virtual reality and any of hybrids of these technologies unless the context indicates otherwise.

A user of the head-worn device may access and use computer software applications to perform various tasks or engage in an entertaining activity. Performing the tasks or engaging in the entertaining activity may require entry of various commands and text into the head-worn device. Therefore, it is desirable to have mechanisms for entering commands and text.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
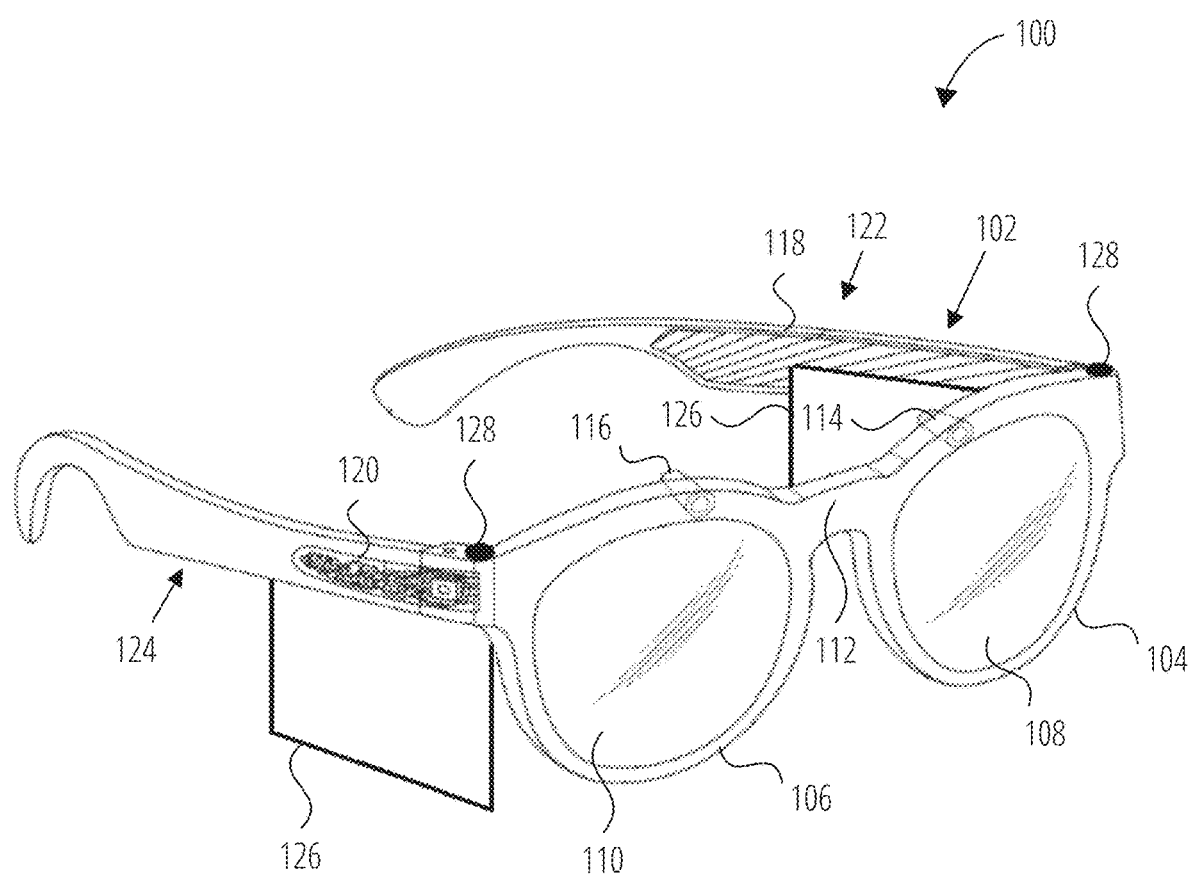
FIG. 1 is a perspective view of a head-worn device, in accordance with some examples.

Head-worn AR systems, such as glasses, are limited when it comes to available user input modalities. As compared other mobile devices, such as mobile phones, it is more complicated for a user of a head-worn AR system to indicate user intent and invoke an action or application. When using a mobile phone, a user may go to a home screen and tap on a specific icon to start an application. However, because of a lack of a physical input device such as a touchscreen or keyboard, such interactions are not as easily performed on the head-worn AR system. Typically, users can indicate their intent by pressing a limited number of hardware buttons or using a small touchpad. Therefore, it would be desirable to have an input modality that allowed for a greater range of inputs that could be utilized by a user to indicate their intent through a user input.

In some examples, an input modality utilized by an AR system is recognition of gestures made by a user that do not involve Direct Manipulation of Virtual Objects (DMVO). The gestures are made by a user moving and positioning portions of the user's body while those portions of the user's body are detectable by an AR system while the user is wearing the AR system. The detectable portions of the user's body may include portions of the user's upper body, arms, hands, and fingers. Components of a gesture may include the movement of the user's arms and hands, location of the user's arms and hands in space, and positions in which the user holds their upper body, arms, hands, and fingers. Gestures are useful in providing an AR experience for a user as they offer a way of providing user inputs into the AR system during an AR experience without having the user take their focus off of the AR experience. As an example, in an AR experience that is an operational manual for a piece of machinery, the user may simultaneously view the piece of machinery in the real-world scene through the lenses of the AR system, view an AR overlay on the real-world scene view of the machinery, and provide user inputs into the AR system.

The cost of low-level image transfer and processing for hand tracking are roughly proportional to the number of pixels in the captured camera image. Accurate inference of hand positions, signed gestures, and user intent is dependent upon having a sufficient number of captured pixels in camera images, that is, the camera images should be of sufficiently high resolution to make out fine details of the user's hands.

Many image sensors used in cameras have a uniform resolution across their Field Of View (FOV), and a user's hands occupy only part of that FOV. Thus, with some image sensors, it is desirable that a narrow field of view limiting the physical space in which users can issue hand input be enforced, or pixels that are captured by the image sensors not used for recognizing hand gestures are wasted.

In some examples, a camera steering component of an AR system alters (herein termed "steers") an angle of an optical axis of a narrow-FOV camera of a camera component of the hand-tracking input pipeline to a location of the user's hands and captures that area at high resolution instead of capturing a larger area of possible hand locations at high resolution. As used herein, an "AR FOV" is a FOV in which an image sensor of a camera can possibly detect user input, a "camera FOV" is a narrowed FOV or sub-FOV of the AR FOV corresponding to where a camera steering component steers an optical axis of a steerable camera.

In some examples, the optical axis of a steerable camera is steered using one or more physical actuators that reposition the steerable camera such as by positioning a camera assembly comprising a sensor and optical elements using pneumatic, hydraulic, or electromechanical actuators and the like.

In some examples, the optical axis of a steerable camera is steered using one or more configurable optical elements comprised of spatial light modulators (SLMs) that spatially modulate their opacity.

In some examples, the optical axis of a steerable camera is steered using one or more configurable optical elements comprised of SLMs that spatially modulate their phase, such as by modifying a refractive index of one or more portions of an SLM or modifying one or more physical dimensions of an SLM.

In some examples, the optical axis of a steerable camera is steered using one or more microelectromechanical system (MEMS) mirrors, or the like.

The camera steering component determines a location of the user's hands based on real-world scene frame data and steers the optical axis of the steerable camera to place the hands of the user in a camera FOV of the steerable camera. The steerable camera captures hand-tracking image data at a high resolution within the camera FOV of the steerable camera.

In some examples, the camera steering component determines a location of the hands of the user in a broader FOV by sweeping within an AR FOV of an AR system with a steerable narrow-FOV camera until the camera steering component recognizes the hands of the user in that AR FOV.

In some examples, the camera steering component determines a location of the hands of the user in a broader FOV using a broad-FOV camera covering an AR FOV of an AR system. The camera steering component recognizes the hands of the user and determines their location using the broad-FOV camera and then steers a narrow-FOV camera to capture video images from that location.

In some examples, the camera steering component, once it has located the hands of the user and begun tracking them, predicts the future location of the hands for future frames and avoids having to re-acquire a location of the hands of the user from scratch on each frame during a continuous input.

Other technical features may be readily apparent to one skilled in the art from the following figures, descriptions, and claims.

FIG. 1 is a perspective view of a head-worn AR system (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the data processor 802 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene.

The glasses 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
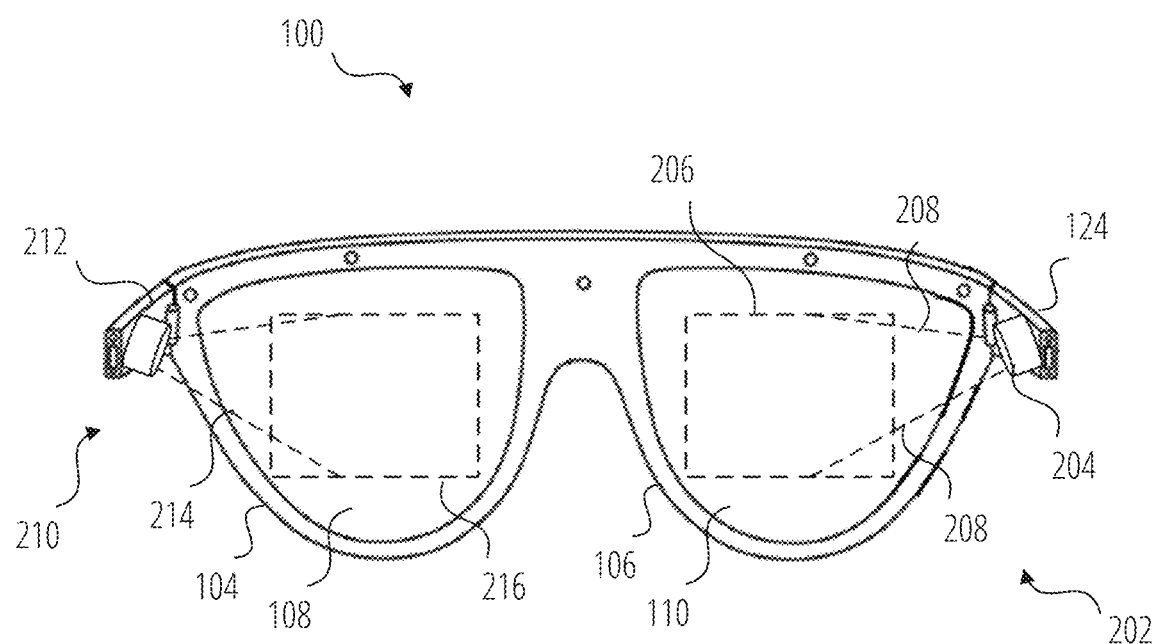
FIG. 2 illustrates a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene seen by the user. The combination of a GPU, the forward optical assembly 202, the left optical element 108, and the right optical element 110 provide an optical engine of the glasses 100. The glasses 100 use the optical engine to generate an overlay of the real-world scene view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g. client device 826 illustrated in FIG. 8), and/or hand movements, locations, and positions recognized by the glasses 100.

Figure 3:
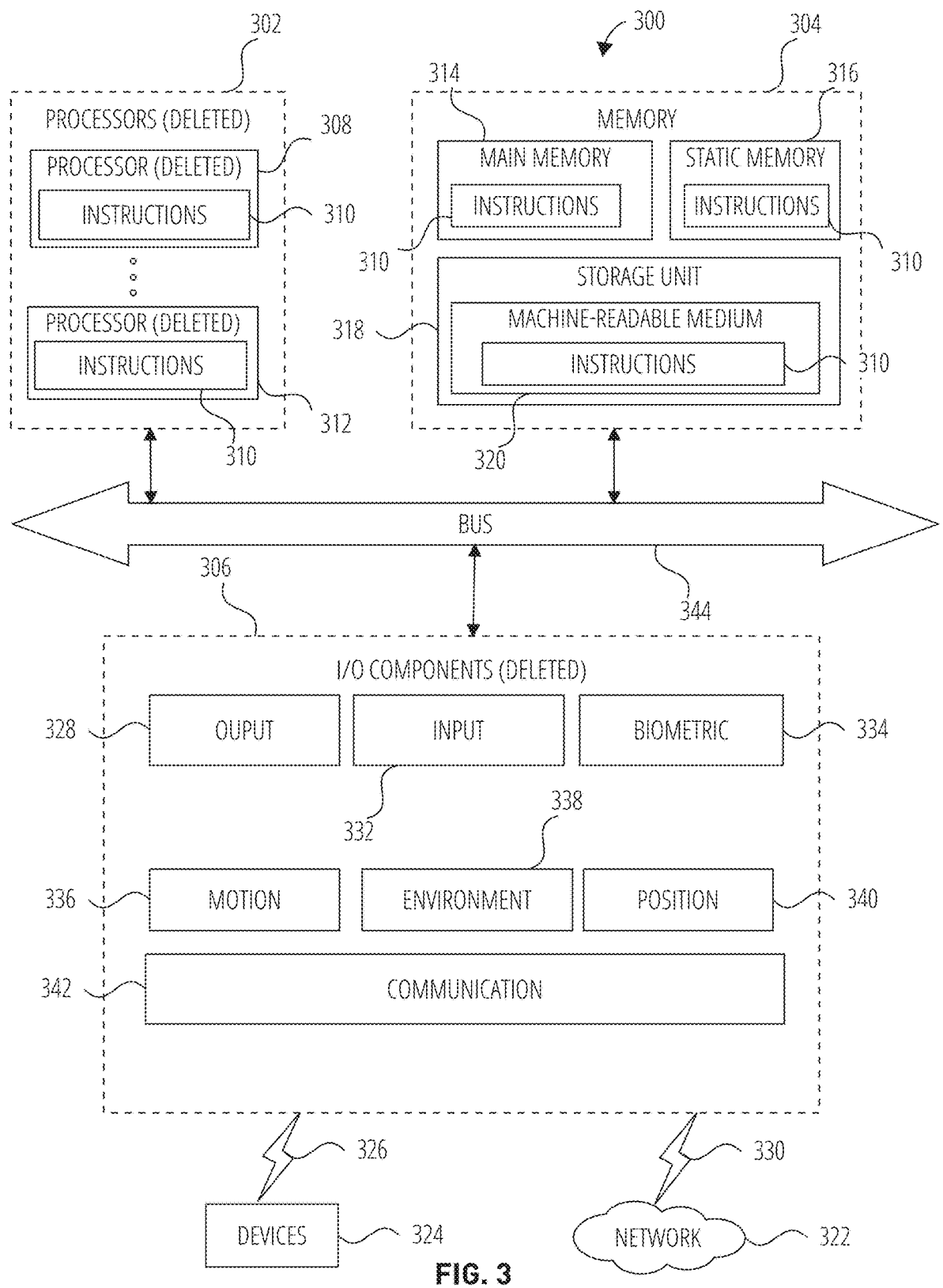
FIG. 3 is a diagrammatic representation of a machine, in the form of a computing apparatus within which a set of instructions may be executed for causing the machine to perform any one or more of the methodologies discussed herein in accordance with some examples.

FIG. 3 is a diagrammatic representation of a machine 300 (such as a computing apparatus) within which instructions 310 (e.g., software, a program, an application, an applet, an app, or other executable code) for causing the machine 300 to perform any one or more of the methodologies discussed herein may be executed. The machine 300 may be utilized as a computer 120 of glasses 100 of FIG. 1. For example, the instructions 310 may cause the machine 300 to execute any one or more of the methods described herein. The instructions 310 transform the general, non-programmed machine 300 into a particular machine 300 programmed to carry out the described and illustrated functions in the manner described. The machine 300 may operate as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 310, sequentially or otherwise, that specify actions to be taken by the machine 300. Further, while a single machine 300 is illustrated, the term "machine" may also be taken to include a collection of machines that individually or jointly execute the instructions 310 to perform any one or more of the methodologies discussed herein.

The machine 300 may include processors 302, memory 304, and I/O components 306, which may be configured to communicate with one another via a bus 344. In some examples, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 308 and a processor 312 that execute the instructions 310. The term "processor" is intended to include multi-core processors that may comprise two or more independent processors (sometimes referred to as "cores") that may execute instructions contemporaneously. Although FIG. 3 shows multiple processors 302, the machine 300 may include a single processor with a single core, a single processor with multiple cores (e.g., a multi-core processor), multiple processors with a single core, multiple processors with multiples cores, or any combination thereof.

The memory 304 includes a main memory 314, a static memory 316, and a storage unit 318, both accessible to the processors 302 via the bus 344. The main memory 304, the static memory 316, and storage unit 318 store the instructions 310 embodying any one or more of the methodologies or functions described herein. The instructions 310 may also reside, completely or partially, within the main memory 314, within the static memory 316, within machine-readable medium 320 within the storage unit 318, within one or more of the processors 302 (e.g., within the processor's cache memory), or any suitable combination thereof, during execution thereof by the machine 300.

The I/O components 306 may include a wide variety of components to receive input, provide output, produce output, transmit information, exchange information, capture measurements, and so on. The specific I/O components 306 that are included in a particular machine will depend on the type of machine. For example, portable machines such as mobile phones may include a touch input device or other such input mechanisms, while a headless server machine will likely not include such a touch input device. It will be appreciated that the I/O components 306 may include many other components that are not shown in FIG. 3. In various examples, the I/O components 306 may include output components 328 and input components 332. The output components 328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 332 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 306 may include biometric components 334, motion components 336, environmental components 338, or position components 340, among a wide array of other components. For example, the biometric components 334 include components to recognize expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 336 may include inertial measurement units (IMUs), acceleration sensor components (e.g., accelerometer), gravitation sensor components, rotation sensor components (e.g., gyroscope), and so forth. The environmental components 338 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position components 340 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 306 further include communication components 342 operable to couple the machine 300 to a network 322 or devices 324 via a coupling 330 and a coupling 326, respectively. For example, the communication components 342 may include a network interface component or another suitable device to interface with the network 322. In further examples, the communication components 342 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 324 may be another machine or any of a wide variety of peripheral devices (e.g., a peripheral device coupled via a USB).

Moreover, the communication components 342 may detect identifiers or include components operable to detect identifiers. For example, the communication components 342 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 342, such as location via Internet Protocol (IP) geolocation, location via Wi-Fi® signal triangulation, location via detecting an NFC beacon signal that may indicate a particular location, and so forth.

The various memories (e.g., memory 304, main memory 314, static memory 316, and/or memory of the processors 302) and/or storage unit 318 may store one or more sets of instructions and data structures (e.g., software) embodying or used by any one or more of the methodologies or functions described herein. These instructions (e.g., the instructions 310), when executed by processors 302, cause various operations to implement the disclosed examples.

The instructions 310 may be transmitted or received over the network 322, using a transmission medium, via a network interface device (e.g., a network interface component included in the communication components 342) and using any one of a number of well-known transfer protocols (e.g., hypertext transfer protocol (HTTP)). Similarly, the instructions 310 may be transmitted or received using a transmission medium via the coupling 326 (e.g., a peer-to-peer coupling) to the devices 324.

Figure 4:
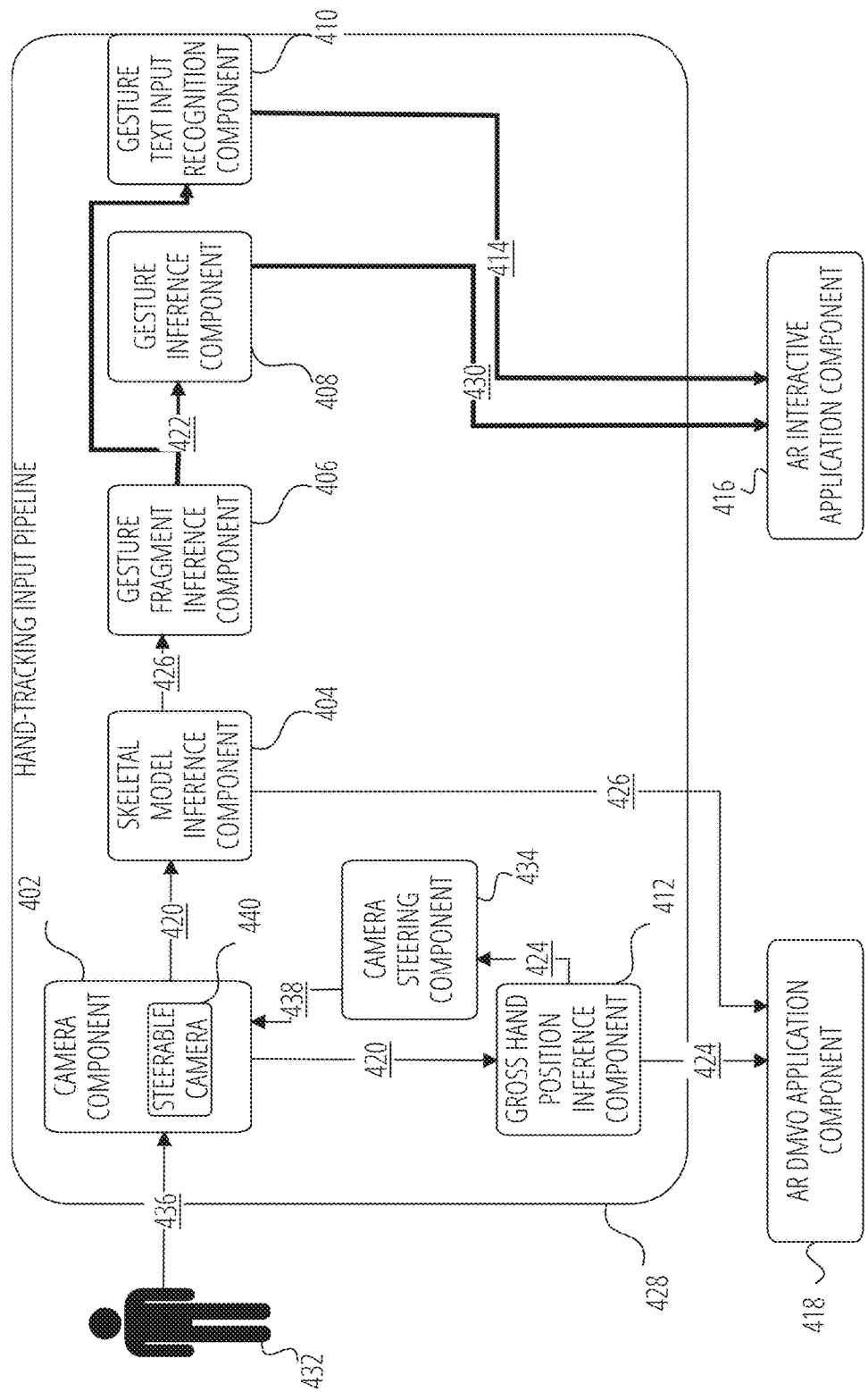
FIG. 4 is collaboration diagram of a hand-tracking input pipeline of an AR system in accordance with some examples.

FIG. 4 is collaboration diagram of a hand-tracking input pipeline 428 of an AR system, such as glasses 100, in accordance with some examples. The hand-tracking input pipeline 428 captures real-world scene video frame data 420 of hand gestures 436 being made by a user 432 as the user 432 interacts with AR applications being provided by the AR system, such as an AR DMVO application component 418 and an AR interactive application component 416. The hand-tracking input pipeline 428 recognizes gesture fragments, gestures, and signs in the captured in the real-world scene video frame data 420 and provides the gesture fragments, gestures, and signs to the AR applications as user input.

The hand-tracking input pipeline 428 includes a camera component 402, including one or more cameras, such as cameras 114 and 116 of FIG. 1, that captures video frame data of a real-world scene environment from a perspective of the user 432 and generates real-world scene video frame data 420 based on the captured video frame data. The real-world scene video frame data 420 includes tracking video frame data of detectable portions of the user's body including portions of the user's upper body, arms, hands, and fingers as the user 432 makes gestures. The tracking video frame data includes video frame data of movement of portions of the user's upper body, arms, and hands as the user 432 makes a gesture or moves their hands and fingers to interact with a real-world scene environment; video frame data of locations of the user's arms and hands in space as the user 432 makes a gesture or moves their hands and fingers to interact with the real-world scene environment; and video frame data of positions in which the user 432 holds their upper body, arms, hands, and fingers as the user 432 makes a gesture or moves their hands and fingers to interact with the real-world scene environment. The camera component 402 communicates the real-world scene video frame data 420 to a skeletal model inference component 404.

The skeletal model inference component 404 recognizes landmark features based on the real-world scene video frame data 420. The skeletal model inference component 404 generates skeletal model data 426 based on the recognized landmark features. The landmark features include landmarks on portions of the user's upper body, arms, and hands in the real-world scene environment. The skeletal model data 426 includes data of a skeletal model representing portions of the user's body such as their hands and arms. In some examples, the skeletal model data 426 also includes landmark data such as landmark identification, location in the real-world scene environment, segments between joints, and categorization information of one or more landmarks associated with the user's upper body, arms, and hands.

In some examples, the skeletal model inference component 404 recognizes landmark features based on the real-world scene video frame data 420 using artificial intelligence methodologies and a skeletal classifier model previously generated using machine learning methodologies. In some examples, a skeletal classifier model comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies may include, but are not limited to, supervised learning, unsupervised learning, semi-supervised learning, reinforcement learning, dimensionality reduction, self-learning, feature learning, sparse dictionary learning, and anomaly detection.

In some examples, the camera component 402 communicates the real-world scene frame data 426 to a gross hand position inference component 412. The gross hand position inference component 412 generates coordinate transformation data 424 based on the real-world scene frame data 426. The gross hand position inference component 412 receives real-world scene video real-world scene video frame data 420 of a real-world scene and extracts features of objects in the real-world scene including the user's upper body, arms, and hands from the real-world scene video frame data. The gross hand position inference component 412 generates coordinate transformation data 424 based on the extracted features. The coordinate transformation data 424 includes a skeletal model of the hands of the user 432 as the user makes hand gestures 436 while interacting with an AR application provided by the AR system. The skeletal model is continuously generated and a transformation is performed of the skeletal model's coordinates into a user coordinate system of the AR system. Other components of the hand-tracking input pipeline 428 can use the coordinate transformation data 424 to determine a location of the hands of the user within a FOV of the camera component 402. The gross hand position inference component 412 communicates the coordinate transformation data 424 to a camera steering component 434.

The camera steering component 434 receives the coordinate transformation data 424 and generates camera steering command data 438 based on the coordinate transformation data 424 as more fully described with reference to FIG. 6. The camera steering command data 438 includes commands that instruct the camera component 402 to adjust an optical axis of a steerable camera 440 of the camera component 402 to align the optical axis to a location of the hands of the user.

In some examples, the gross hand position inference component 412 also communicates the coordinate transformation data 424 to the AR DMVO application component 418.

The gesture fragment inference component 406 receives the skeletal model data 426 from the skeletal model inference component 404 and generates gesture fragment data 422 based on the skeletal model data 426. Gestures are specified by the hand-tracking input pipeline 428 in terms of combinations of gesture fragments. The gesture fragments are in turn composed of combinations and relationships of landmarks included in the skeletal model data 426. As the hand-tracking input pipeline 428 extracts gesture fragments from the skeletal model data 426 by the hand-tracking input pipeline 428 in a layer distinct from assembly of hand movements into gestures, a designer of the AR system may create new gestures built out of existing gesture fragments composing already known gestures without having to re-train machine learning components of the hand-tracking input pipeline 428.

In some examples, the gesture fragment inference component 406 compares one or more skeletal models included in the skeletal model data 426 to previously generated gesture fragment models and generates one or more gesture fragment probabilities on the basis of the comparison. The one or more gesture fragment probabilities indicate a probability that a specified gesture fragment can be identified from the skeletal model data 426. The gesture fragment inference component 406 generates gesture fragment data 422 based on the one or more gesture fragment probabilities. In additional examples, the gesture fragment inference component 406 determines the one or more gesture fragment probabilities on a basis of categorizing a skeletal model in the skeletal model data 426 using artificial intelligence methodologies and a gesture fragment model previously generated using machine learning methodologies. The gesture fragment inference component 406 communicates that gesture fragment data 422 to a gesture inference component 408 and a gesture text input recognition component 410.

The gesture inference component 408 receives the gesture fragment data 422 and determines gesture data 430 based on the gesture fragment data 422. In some examples, the gesture inference component 408 compares gesture fragments identified in the gesture fragment data 422 to gesture identification data identifying specific gestures. A gesture identification is composed of one or more gesture fragments that correspond to a specific gesture. A gesture identification is defined using a grammar whose symbols correspond to gesture fragments. For example, a gesture identification for a gesture is "LEFT_PALMAR_FINGERS EXTENDED_RIGHT PALMAR_FINGERS_EXTENDED" where: "LEFT" is a symbol corresponding to a hand classifier indicating that the user's left hand has been recognized; "PALMAR" is a symbol corresponding to a hand classifier indicating that a palm of a hand of the user has been recognized and modifies "LEFT" to indicate that the user's left hand palm has been recognized; "FINGERS" is a symbol corresponding to a hand classifier indicating that the user's fingers have been recognized; and "EXTENDED" is a symbol corresponding to a hand classifier indicating that the user's fingers are extended and modifies "FINGERS". In additional examples, a gesture identification is a single token, such as a number, identifying a gesture based on the gesture's component gesture fragment. A gesture identification identifies a gesture in the context of a physical description of the gesture. The gesture inference component 408 communicates the gesture data 430 to an AR interactive application component 416.

The gesture text input recognition component 410 receives the gesture fragment data 422 and generates symbol data 414 based on the gesture fragment data 422. In some examples, the gesture text input recognition component 410 compares gesture fragments identified in the gesture fragment data 422 to symbol data identifying specific characters, words, and commands. For example, symbol data for a gesture is the character "V" as a gesture that is a fingerspelling sign in American Sign Language (ASL). The individual gesture fragments for the gesture may be "LEFT" for left hand, "PALMAR" for the palm of the left hand, "INDEXFINGER" for the index finger "EXTENDED" modifying "INDEXFINGER", "MIDDLEFINGER" for the middle finger, "EXTENDED" modifying "MIDDLEFIN- GER", "RINGFINGER" for the ring finger, "CURLED" modifying "RINGFINGER", "LITTLEFINGER" for the little finger, "CURLED" modifying "LITTLEFINGER", "THUMB" for the thumb and "CURLED" modifying "THUMB".

In some examples, entire words may also be identified by the gesture text input recognition component 410 based on gesture fragments indicated by the gesture fragment data 422. In additional examples, a command, such as command corresponding to a specified set of keystrokes in an input system having a keyboard, may be identified by the gesture text input recognition component 410 based on gesture fragments indicated by the gesture fragment data 422.

The gesture text input recognition component 410 communicates the symbol data 414 to the AR interactive application component 416.

AR application components executed by the AR system, such as AR DMVO application component 418 and AR interactive application component 416, are consumers of the data generated by the hand-tracking input pipeline 428, such as coordinate transformation data 424, skeletal model data 426, gesture data 430, and symbol data 414. The AR system executes the AR DMVO application component 418 to provide a user interface to a user of the AR system utilizing direct manipulation of visual objects within a 2D or 3D user interface. The AR system executes the AR interactive application component 416 to provide a user interface to a user of the AR system, such as an AR experience, utilizing gestures as an input modality.

In some examples, the camera component 402, skeletal model inference component 404, and gross hand position inference component 412 communicate using an automatically synchronized shared-memory buffer. In addition, the skeletal model inference component 404 and gross hand position inference component 412 publish the skeletal model data 426 and the coordinate transformation data 424, respectively, on a memory buffer that is accessible by components and applications outside of the hand-tracking input pipeline 428, such as the AR DMVO application component 418.

In many examples, the gesture fragment inference component 406, the gesture inference component 408, and gesture text input recognition component 410 communicate the gesture data 430 and the symbol data 414, respectively, via inter process communication methodologies.

In some examples, the hand-tracking input pipeline 428 operates continuously generating and publishing gesture data 430, symbol data 414, coordinate transformation data 424 based on the real-world scene frame data 426 generated by the one or more cameras of the AR system.

Figure 5A:
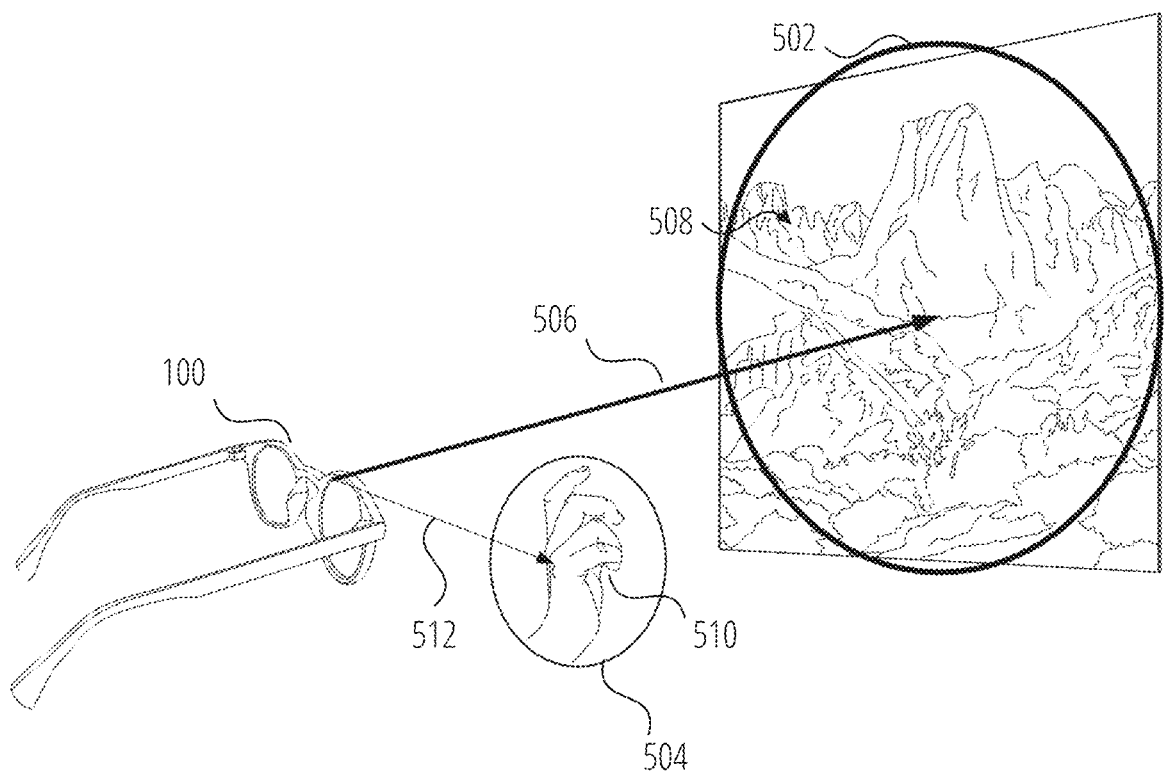
FIG. 5A is a diagram illustrating operation of a steerable camera by an AR system in accordance with some examples.
Figure 5B:
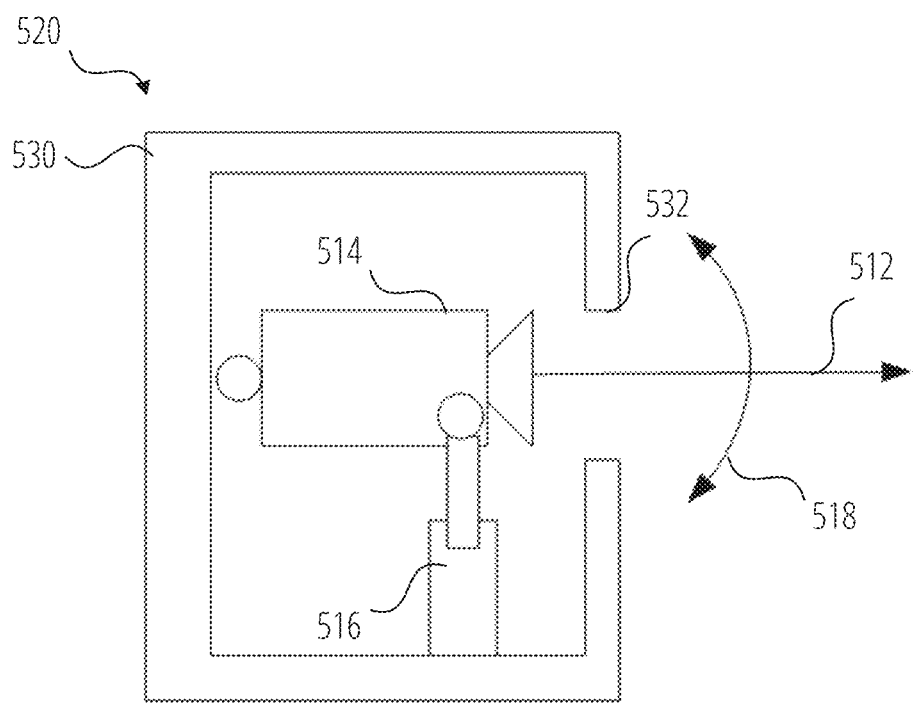
FIG. 5B is a block diagram of a steerable camera in accordance with some examples.
Figure 5C:
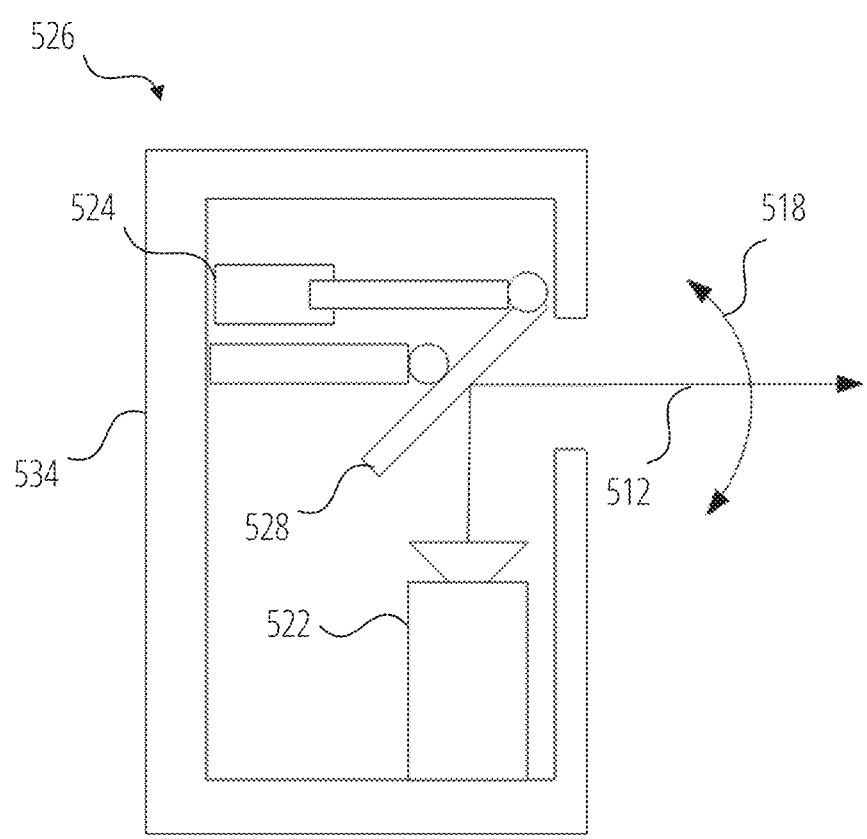
FIG. 5C is a block diagram of another steerable camera in accordance with some examples.

FIG. 5A is a diagram illustrating operation of a steerable camera by an AR system, and FIG. 5B and FIG. 5C are block diagrams of steerable cameras in accordance with some examples. An AR system, such as glasses 100, alters (steers) an angle 518 of an optical axis 512 of a steerable camera, such as steerable camera 520 and steerable camera 526, to include one or more hands 510 of a user in a camera FOV 504 of the steerable camera as the user makes hand gestures while using the AR system. A methodology for steering a steerable camera 520 is more fully disclosed in FIG. 6 and its related description. An AR camera of the AR system captures video frame data of a real-world scene 508 in an AR FOV 502 of the AR camera. An optical axis 506 of the AR camera aligns with an optical axis of a user wearing the glasses 100. In some examples, the AR camera and the steerable camera are the same camera and a camera steering component 434 of a hand-tracking input pipeline 428 steers the steerable camera to alternate scanning between the one or more hands 510 of the user and the real-world scene 508.

FIG. 5B is a diagram of a steerable camera 520 of a camera component 402 of the hand-tracking input pipeline 428. The steerable camera 520 includes one or more actuators 516 linked to a camera 514 having an image sensor and lens assembly. The camera 514 is movably attached to an interior surface of a housing 530 of the steerable camera 520 and is positioned such that a lens of the camera 514 aligns with an aperture 532 of the housing 530. A pitch angle of the camera 514 is adjusted by transmitting a pitch adjustment command to the camera component 402. The camera component 402 receives the pitch adjustment command and generates an electrical signal that causes a pitch actuator of the one or more actuators 516 to move the camera and change the pitch angle of the camera 514 along a pitch optical axis angle 518, and thus alter the optical axis 512 of the steerable camera 520. In some examples, a yaw angle of the camera 514 is adjusted by communicating a yaw adjustment command to the camera component 402. The camera component 402 receives the yaw adjustment command and generates an electrical signal causing a yaw actuator of the one or more actuators 516 of the steerable camera 520 to alter the yaw angle of the camera 514 through a yaw optical axis angle (not shown), and thus alter the optical axis 512 of the steerable camera 520.

FIG. 5C is a diagram of a steerable camera 526 of a camera component 402 of the hand-tracking input pipeline 428. The steerable camera 526 includes one or more actuators 524 that move a mirror 528 that is pivotably attached to an interior surface of a housing 534 of the steerable camera 526. A camera 522 having an image sensor and a lens assembly stays stationary while a pitch angle and/or a yaw angle of the mirror are adjusted using the one or more actuators 524. A pitch angle of the steerable camera 526 is adjusted by transmitting a pitch adjustment command to the camera component 402. The camera component 402 receives the pitch adjustment command and generates an electrical signal that causes a pitch actuator of the steerable camera to change the pitch angle of the mirror, thus altering (steering) an optical axis 512 of the steerable camera 526 through a pitch optical axis angle 518. In some examples, a yaw angle of the steerable camera 526 is adjusted by communicating a yaw adjustment command to the camera component 402. The camera component 402 receives the yaw adjustment command and generates an electrical signal causing a yaw actuator of the one or more actuators 524 to change the yaw angle of the mirror, thus altering (steering) the optical axis 512 of the steerable camera 526 through a yaw optical axis angle (not shown).

Figure 5D:
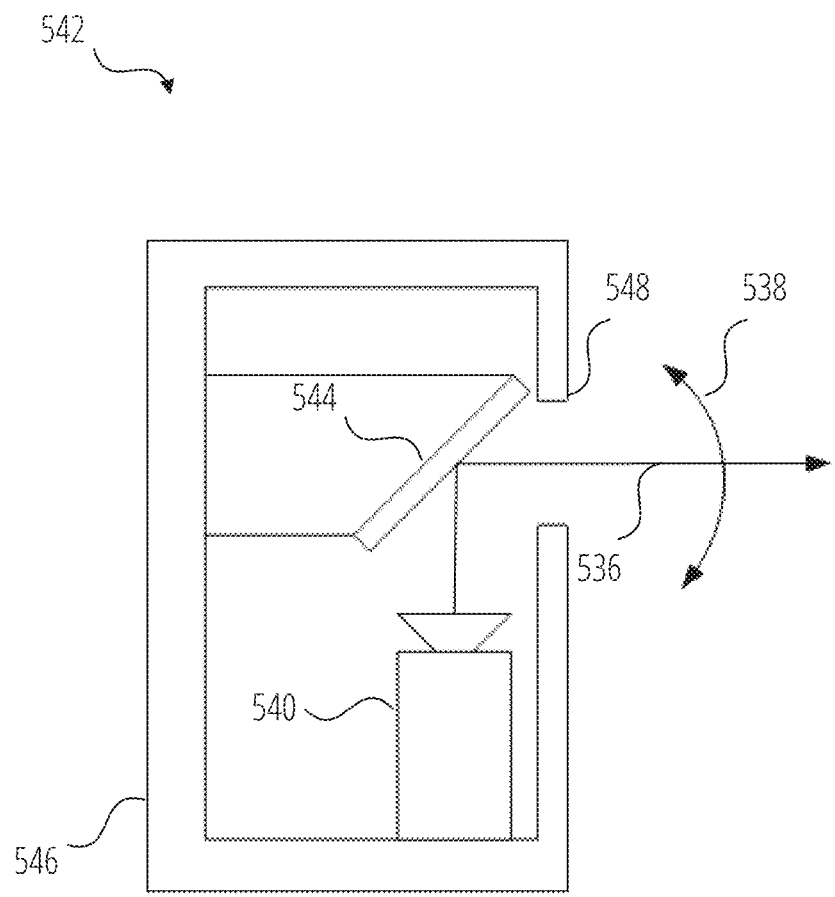
FIG. 5D illustrates an aspect of the subject matter in accordance with one embodiment.

FIG. 5D is a diagram of a steerable camera 542 of a camera component 402 of the hand-tracking input pipeline 428 in accordance with some examples of the disclosure. In some examples, a steerable camera 542 of a camera component 402 includes a optical assembly having one or more configurable SLMs 544 that spatially modulate their opacity and/or a phase of one or more optical elements. A camera 522 having an image sensor and a lens assembly stays stationary of the steerable camera 542 stays stationary while the spatial distribution of the opacity and or a phase of the configurable SLM 544 optical element is adjusted. The camera 540 and configurable SLM 544 are mounted in a housing 546 whereby an optical axis 536 of the camera 540 passes through an aperture 548 of the housing. The spatial distribution of the opacity and or phase of the configurable SLM 544 optical element is adjusted by transmitting a phase adjustment command to the camera component 402. The camera component 402 generates a thermal or an electrical signal that causes the spatial distribution of the opacity and/or phase of the configurable SLM 544 optical element to be changed, thus altering (steering) the optical axis 536 of the camera component 402 through a pitch angle 538 and or a yaw angle (not shown).

Figure 6:
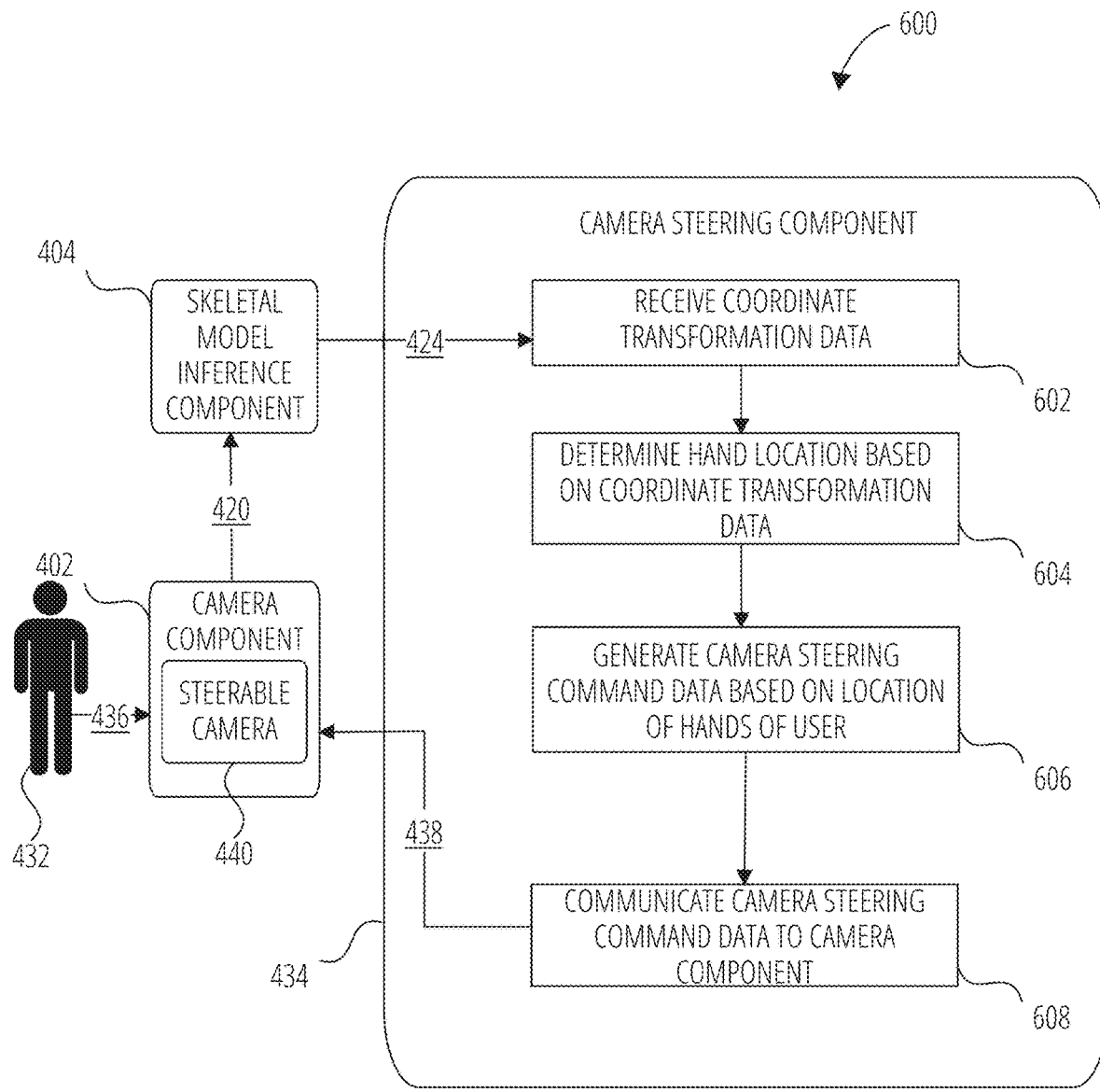
FIG. 6 is a process flow diagram of a steerable camera steering method in accordance with some examples.

FIG. 6 is a process flow diagram of a steerable camera steering method 600 in accordance with some examples. An AR system uses the steerable camera steering method 600 to steer a steerable camera 440 of a camera component 402 to align an optical axis of the steerable camera 440 with one or more hands of a user 432 of the AR system.

As previously described in reference to FIG. 4, a camera component 402 having a steerable camera 440 generates real-world scene video frame data 420 based on the captured video frame data. The real-world scene video frame data 420 includes tracking video frame data of detectable portions of the user's body including portions of the user's upper body, arms, hands, and fingers as the user 432 makes gestures. The camera component 402 communicates the real-world scene video frame data 420 to a skeletal model inference component 404. The skeletal model inference component 404 recognizes landmark features based on the real-world scene video frame data 420. The skeletal model inference component 404 generates skeletal model data 426 based on the recognized landmark features and communicates the real-world scene frame data 426 to a gross hand position inference component 412. The gross hand position inference component 412 generates coordinate transformation data 424 based on the real-world scene frame data 426. For example, the coordinate transformation data 424 includes coordinates of a skeletal model of one or more hands of the user 432 expressed in a 3D spherical coordinate system having a viewpoint of the user 432 as an origin. That is, each joint of the skeletal model has coordinates of 'r' a radius of the joint from the point of origin, 'θ' an inclination angle of the joint, and 'Φ' an azimuth angle of the joint. The gross hand position inference component 412 communicates the coordinate transformation data 424 to a camera steering component 434.

In operation 602, the camera steering component 434 receives the coordinate transformation data 424 from the skeletal model inference component 404.

In operation 604, the camera steering component 434 determines a location of one or more hands of the user 432 within a camera FOV of the camera component 402 based on the coordinate transformation data 424. For example, the camera steering component 434 determines a centroid of a skeletal model of one or more hands of the user 432 and projects a ray extending from the viewpoint of the user 432 to the centroid of the skeletal model. The ray has coordinates of (r, θ, Φ) where r is a distance from the viewpoint of the user 432 to the centroid of the skeletal model, θ is the inclination angle of the ray, and Φ is the azimuth angle of the ray.

In operation 606, the camera steering component 434 generates steering command data based on the location of the one or more hands of the user 432. For example, Accordingly, a pitch angle of an optical axis of the steerable camera 440 of the camera component 402 corresponds to the azimuth angle of the ray, or Φ, and a yaw angle of steerable camera 440 corresponds to the inclination angle of the ray, or θ. The camera steering command data 438 includes a pitch adjustment command instructing the camera component 402 to set a pitch angle of a steerable camera 440 of the camera component 402 to the azimuth angle of the ray projected from the viewpoint of the user 432 to the centroid of the skeletal model of the one or more hands of the user 432. In some examples, the camera steering command data 438 also includes a yaw adjustment command to the camera component to set a yaw angle of a steerable camera 440 of the camera component 402 to the inclination angle of the ray projected from the viewpoint of the user 432 to the centroid of the skeletal model of the one or more hands of the user 432.

In operation 608, the camera steering component 434 communicates the camera steering command data 438 to the camera component 402. The camera component 402 receives the camera steering command data 438 and steers an optical axis of the steerable camera 440 to align with the centroid of the one or more hands of the user 432 based on the pitch adjustment command of the camera steering command data 438. This focuses the steerable camera 440 on the one or more hands of the user 432 and places the one or more hands of the user in a camera FOV of the steerable camera 440. In some examples, The camera component 402 receives the camera steering command data 438 and steers an optical axis of the steerable camera 440 to align with the centroid of the one or more hands of the user 432 based on the yaw adjustment command of the camera steering command data 438. This focuses the steerable camera 440 on the one or more hands of the user 432 and places the one or more hands of the user in a camera FOV of the steerable camera 440.

In some examples, a non-steerable camera of the camera component 402 having a camera FOV equal to the AR FOV captures the real-world scene video frame data 420 used to generate the steering command data. In some examples, the non-steerable camera has a wider camera FOV than the steerable camera 440. In some examples, the non-steerable camera has a lower resolution than the steerable camera 440.

In some examples, to initially locate the one or more hands of the user 432, the camera steering component 434 scans within an AR FOV for the one or more hands using the steerable camera 440. Once the camera steering component 434 finds the one or more hands of the user 432, the camera steering component 434 uses a look-ahead process to predict a next location of the one or more hands of the user 432 based on a current location of the one or more hands of the user 432. The camera steering component 434 steers the steerable to focus on the next location. In some examples, camera steering component 434 receives gesture fragment data 422 from the gesture fragment inference component 406 and determines a possible next gesture fragment and location based on the gesture fragment data 422 and a language model. In some examples, the language model is for American Sign Language (ASL), and the language model is used to recognize gesture fragments of signs in ASL.

The camera steering component 434 determines a probable next gesture fragment N based on previous gesture fragments N-1, N-2, etc. and the language gesture fragment data 422. The camera steering component 434 generates a probable next location of the one or more hands of the user 432 based on the probable next gesture fragment N.

In an example, the camera steering component 434 determines the probable next gesture fragment based on a language model that is a hidden Markov model predicting what the probable next gesture fragment N is based on one or more of the previous gesture fragments N-1, N-2, etc.

In another example, the camera steering component 434 uses AI methodologies to determine the next gesture fragment N based on a language model that is generated using machine learning methodologies. In some examples, a language model comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies may include, but are not limited to, supervised learning, unsupervised learning, semi-supervised learning, reinforcement learning, dimensionality reduction, self-learning, feature learning, sparse dictionary learning, and anomaly detection.

Figure 7:
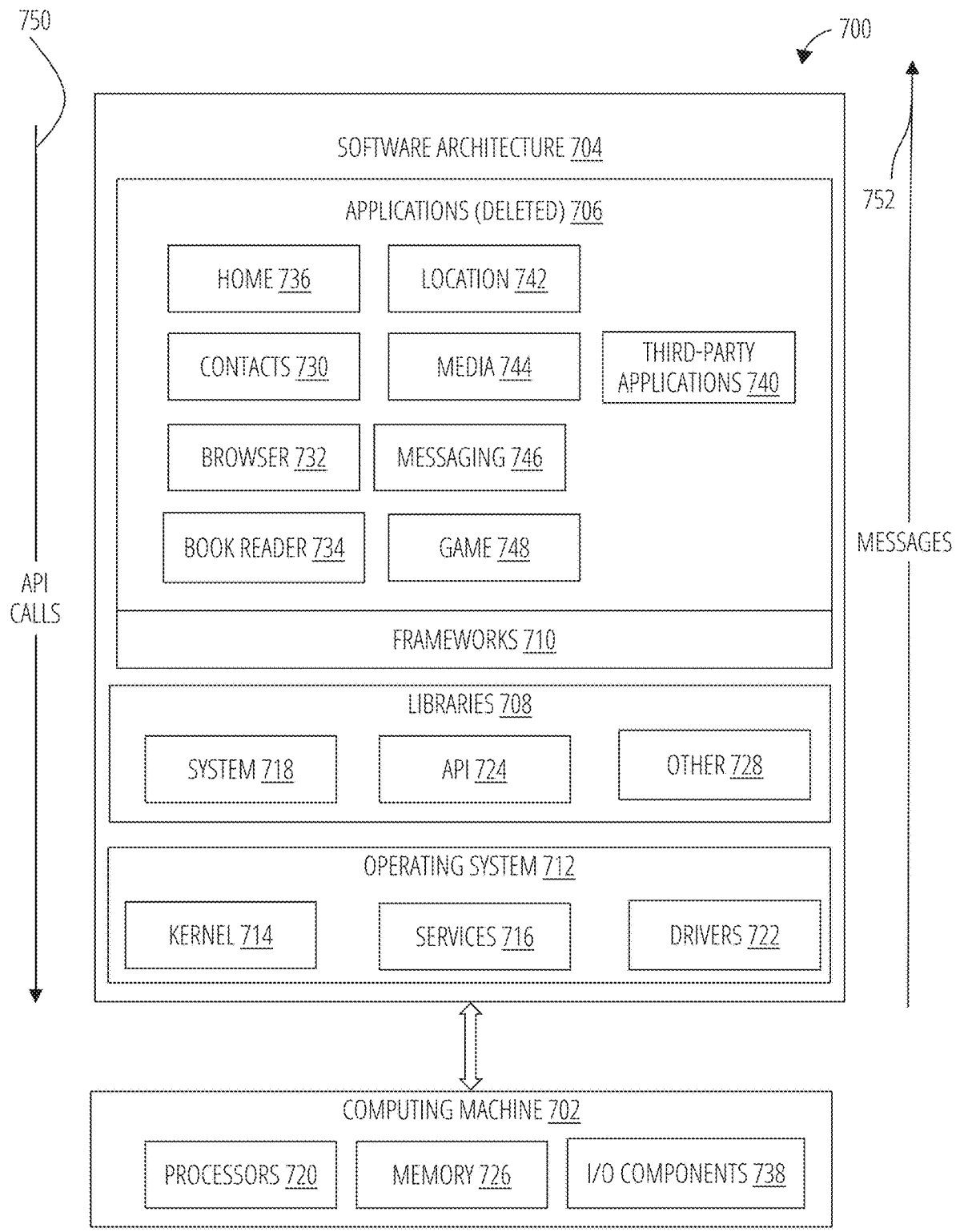
FIG. 7 is a block diagram illustrating a software architecture within which the present disclosure may be implemented, in accordance with some examples.

FIG. 7 is a block diagram 700 illustrating a software architecture 704, which can be installed on any one or more of the devices described herein. The software architecture 704 is supported by hardware such as a computing machine 702 that includes processors 720, memory 726, and I/O components 738. In this example, the software architecture 704 can be conceptualized as a stack of layers, where individual layers provide a particular functionality. The software architecture 704 includes layers such as an operating system 712, libraries 708, frameworks 710, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionalities. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 708 provide a low-level common infrastructure used by the applications 706. The libraries 708 can include system libraries 718 (e.g., C standard library) that provide functions such as memory allocation functions, string manipulation functions, mathematic functions, and the like. In addition, the libraries 708 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g. OpenIMAJ), database libraries (e.g., SQLite to provide various relational database functions), web libraries (e.g., WebKit to provide web browsing functionality), and the like. The libraries 708 can also include a wide variety of other libraries 728 to provide many other APIs to the applications 706.

The frameworks 710 provide a high-level common infrastructure that is used by the applications 706. For example, the frameworks 710 provide various graphical user interface (GUI) functions, high-level resource management, and high-level location services. The frameworks 710 can provide a broad spectrum of other APIs that can be used by the applications 706, some of which may be specific to a particular operating system or platform.

In some examples, the applications 706 may include a home application 736, a contacts application 730, a browser application 732, a book reader application 734, a location application 742, a media application 744, a messaging application 746, a game application 748, and a broad assortment of other applications such as third-party applications 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party applications 740 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 740 can invoke the API calls 750 provided by the operating system 712 to facilitate functionality described herein.

Figure 8:
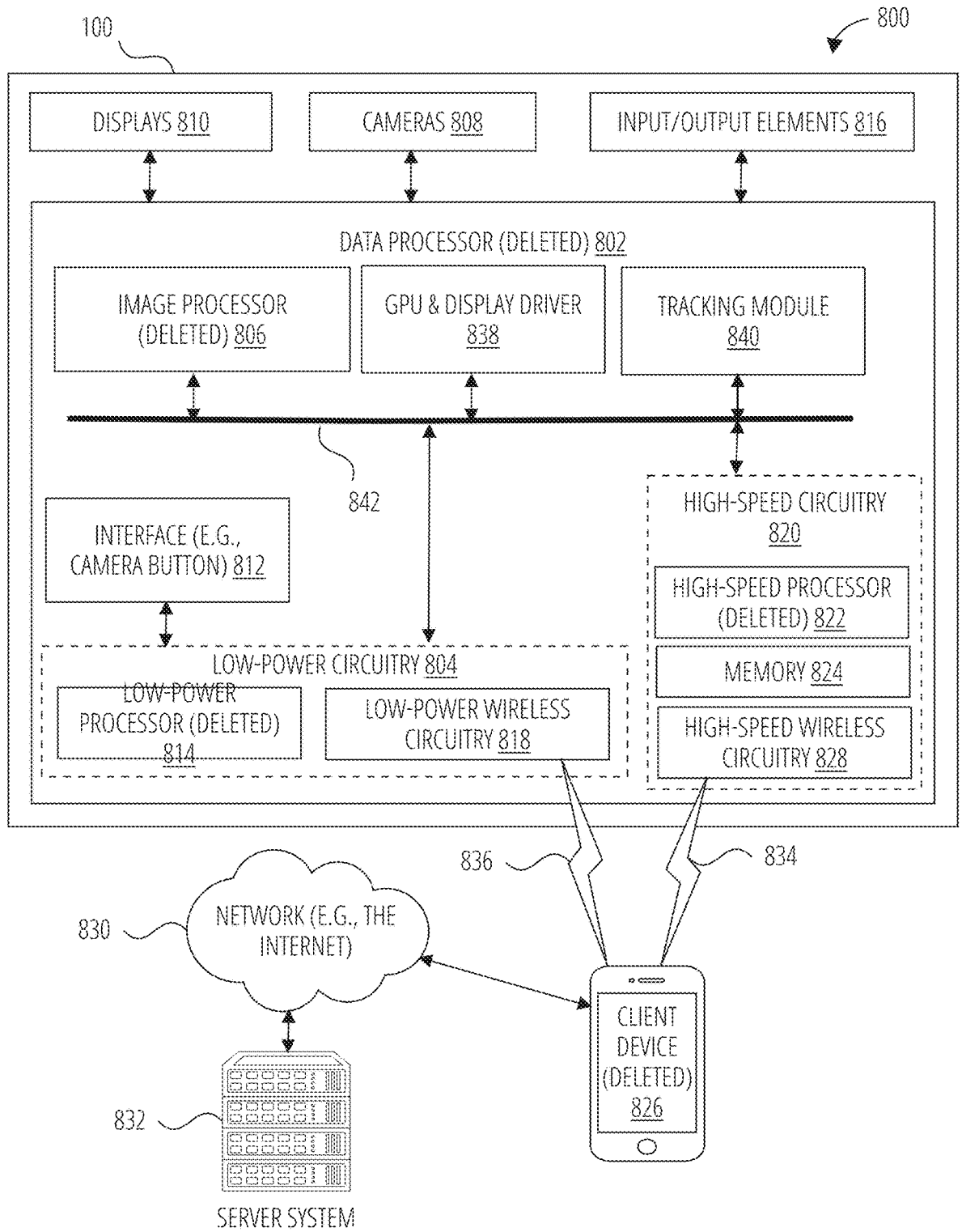
FIG. 8 is a block diagram illustrating a networked system including details of a head-worn AR system, in accordance with some examples.

FIG. 8 is a block diagram illustrating a networked system 800 including details of the glasses 100, in accordance with some examples. The networked system 800 includes the glasses 100, a client device 826, and a server system 832. The client device 826 may be a smartphone, tablet, phablet, laptop computer, access point, or any other such device capable of connecting with the glasses 100 using a low-power wireless connection 836 and/or a high-speed wireless connection 834. The client device 826 is connected to the server system 832 via the network 830. The network 830 may include any combination of wired and wireless connections. The server system 832 may be one or more computing devices as part of a service or network computing system. The client device 826 and any elements of the server system 832 and network 830 may be implemented using details of the software architecture 704 or the machine 300 described in FIG. 7 and FIG. 3 respectively.

The glasses 100 include a data processor 802, displays 810, one or more cameras 808, and additional input/output elements 816. The input/output elements 816 may include microphones, audio speakers, biometric sensors, additional sensors, or additional display elements integrated with the data processor 802. Examples of the input/output elements 816 are discussed further with respect to FIG. 7 and FIG. 3. For example, the input/output elements 816 may include any of I/O components 306 including output components 328, motion components 336, and so forth. Examples of the displays 810 are discussed in FIG. 2. In the particular examples described herein, the displays 810 include a display for the user's left and right eyes.

The data processor 802 includes an image processor 806 (e.g., a video processor), a GPU & display driver 838, a tracking module 840, an interface 812, low-power circuitry 804, and high-speed circuitry 820. The components of the data processor 802 are interconnected by a bus 842.

The interface 812 refers to any source of a user command that is provided to the data processor 802. In one or more examples, the interface 812 is a physical button that, when depressed, sends a user input signal from the interface 812 to a low-power processor 814. A depression of such button followed by an immediate release may be processed by the low-power processor 814 as a request to capture a single image, or vice versa. A depression of such a button for a first period of time may be processed by the low-power processor 814 as a request to capture video data while the button is depressed, and to cease video capture when the button is released, with the video captured while the button was depressed stored as a single video file. Alternatively, depression of a button for an extended period of time may capture a still image. In some examples, the interface 812 may be any mechanical switch or physical interface capable of accepting user inputs associated with a request for data from the cameras 808. In other examples, the interface 812 may have a software component, or may be associated with a command received wirelessly from another source, such as from the client device 826.

The image processor 806 includes circuitry to receive signals from the cameras 808 and process those signals from the cameras 808 into a format suitable for storage in the memory 824 or for transmission to the client device 826. In one or more examples, the image processor 806 (e.g., video processor) comprises a microprocessor integrated circuit (IC) customized for processing sensor data from the cameras 808, along with volatile memory used by the microprocessor in operation.

The low-power circuitry 804 includes the low-power processor 814 and the low-power wireless circuitry 818. These elements of the low-power circuitry 804 may be implemented as separate elements or may be implemented on a single IC as part of a system on a single chip. The low-power processor 814 includes logic for managing the other elements of the glasses 100. As described above, for example, the low-power processor 814 may accept user input signals from the interface 812. The low-power processor 814 may also be configured to receive input signals or instruction communications from the client device 826 via the low-power wireless connection 836. The low-power wireless circuitry 818 includes circuit elements for implementing a low-power wireless communication system. Bluetooth™ Smart, also known as Bluetooth™ low energy, is one standard implementation of a low power wireless communication system that may be used to implement the low-power wireless circuitry 818. In other examples, other low power communication systems may be used.

The high-speed circuitry 820 includes a high-speed processor 822, a memory 824, and a high-speed wireless circuitry 828. The high-speed processor 822 may be any processor capable of managing high-speed communications and operation of any general computing system used for the data processor 802. The high-speed processor 822 includes processing resources used for managing high-speed data transfers on the high-speed wireless connection 834 using the high-speed wireless circuitry 828. In some examples, the high-speed processor 822 executes an operating system such as a LINUX operating system or other such operating system such as the operating system 712 of FIG. 7. In addition to any other responsibilities, the high-speed processor 822 executing a software architecture for the data processor 802 is used to manage data transfers with the high-speed wireless circuitry 828. In some examples, the high-speed wireless circuitry 828 is configured to implement Institute of Electrical and Electronic Engineers (IEEE) 802.11 communication standards, also referred to herein as Wi-Fi. In other examples, other high-speed communications standards may be implemented by the high-speed wireless circuitry 828.

The memory 824 includes any storage device capable of storing camera data generated by the cameras 808 and the image processor 806. While the memory 824 is shown as integrated with the high-speed circuitry 820, in other examples, the memory 824 may be an independent standalone element of the data processor 802. In some such examples, electrical routing lines may provide a connection through a chip that includes the high-speed processor 822 from image processor 806 or the low-power processor 814 to the memory 824. In other examples, the high-speed processor 822 may manage addressing of the memory 824 such that the low-power processor 814 will boot the high-speed processor 822 any time that a read or write operation involving the memory 824 is desired.

The tracking module 840 estimates a pose of the glasses 100. For example, the tracking module 840 uses image data and associated inertial data from the cameras 808 and the position components 340, as well as GPS data, to track a location and determine a pose of the glasses 100 relative to a frame of reference (e.g., real-world scene). The tracking module 840 continually gathers and uses updated sensor data describing movements of the glasses 100 to determine updated three-dimensional poses of the glasses 100 that indicate changes in the relative position and orientation relative to physical objects in the real-world scene. The tracking module 840 permits visual placement of virtual objects relative to physical objects by the glasses 100 within the field of view of the user via the displays 810.

The GPU & display driver 838 may use the pose of the glasses 100 to generate frames of virtual content or other content to be presented on the displays 810 when the glasses 100 are functioning in a traditional augmented reality mode. In this mode, the GPU & display driver 838 generates updated frames of virtual content based on updated three-dimensional poses of the glasses 100, which reflect changes in the position and orientation of the user in relation to physical objects in the user's real-world scene.

One or more functions or operations described herein may also be performed in an application resident on the glasses 100 or on the client device 826, or on a remote server. For example, one or more functions or operations described herein may be performed by one of the applications 706 such as messaging application 746.

Figure 9:
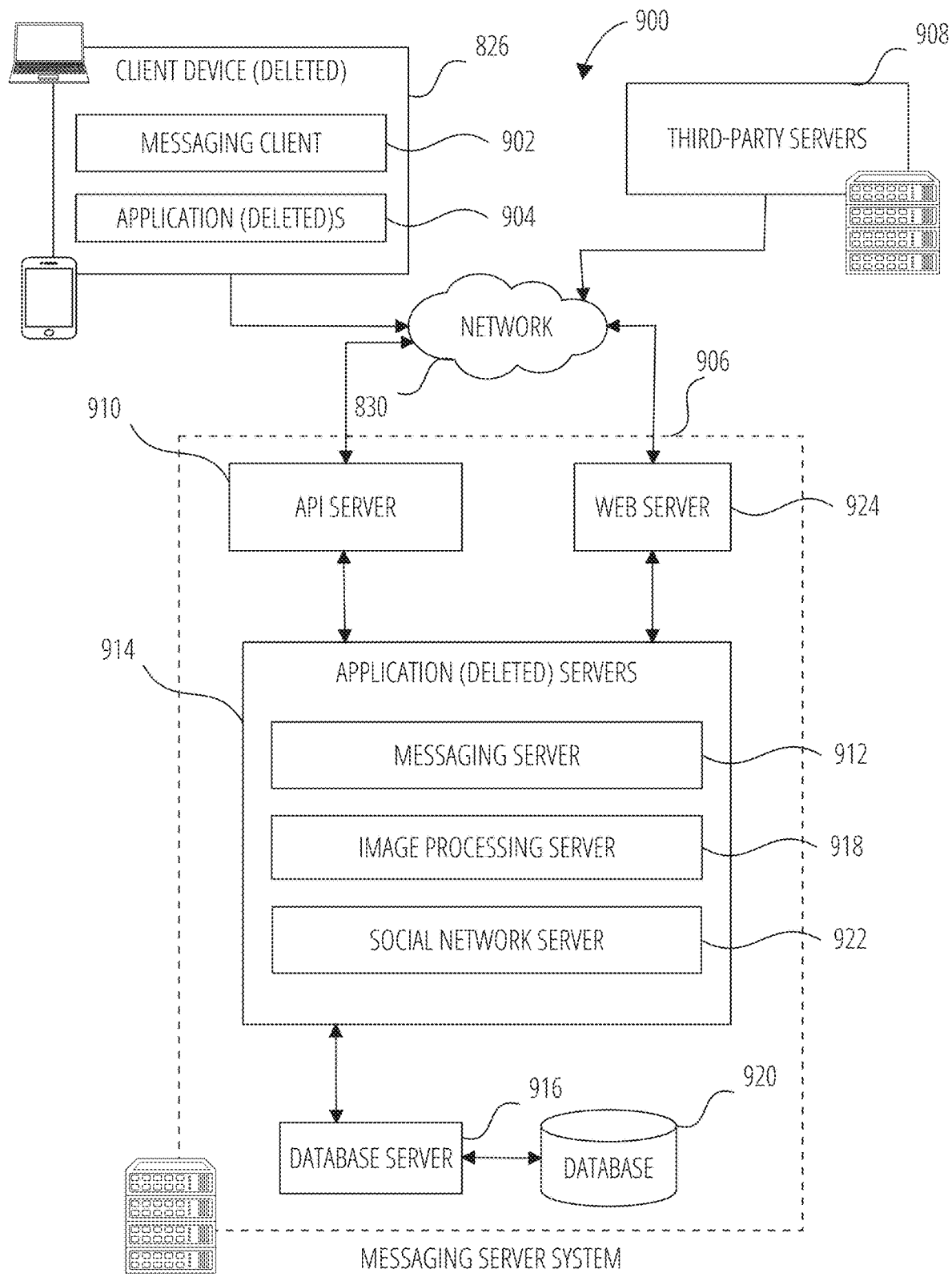
FIG. 9 is a block diagram illustrating an example messaging system for exchanging data (e.g., messages and associated content) over a network in accordance with some examples

FIG. 9 is a block diagram showing an example messaging system 900 for exchanging data (e.g., messages and associated content) over a network. The messaging system 900 includes multiple instances of a client device 826 which host a number of applications, including a messaging client 902 and other applications 904. A messaging client 902 is communicatively coupled to other instances of the messaging client 902 (e.g., hosted on respective other client devices 826), a messaging server system 906 and third-party servers 908 via a network 830 (e.g., the Internet). A messaging client 902 can also communicate with locally-hosted applications 904 using Application Program Interfaces (APIs).

A messaging client 902 is able to communicate and exchange data with other messaging clients 902 and with the messaging server system 906 via the network 830. The data exchanged between messaging clients 902, and between a messaging client 902 and the messaging server system 906, includes functions (e.g., commands to invoke functions) as well as payload data (e.g., text, audio, video or other multimedia data).

The messaging server system 906 provides server-side functionality via the network 830 to a particular messaging client 902. While some functions of the messaging system 900 are described herein as being performed by either a messaging client 902 or by the messaging server system 906, the location of some functionality either within the messaging client 902 or the messaging server system 906 may be a design choice. For example, it may be technically preferable to initially deploy some technology and functionality within the messaging server system 906 but to later migrate this technology and functionality to the messaging client 902 where a client device 826 has sufficient processing capacity.

The messaging server system 906 supports various services and operations that are provided to the messaging client 902. Such operations include transmitting data to, receiving data from, and processing data generated by the messaging client 902. This data may include message content, client device information, geolocation information, media augmentation and overlays, message content persistence conditions, social network information, and live event information, as examples. Data exchanges within the messaging system 900 are invoked and controlled through functions available via user interfaces (UIs) of the messaging client 902.

Turning now specifically to the messaging server system 906, an Application Program Interface (API) server 910 is coupled to, and provides a programmatic interface to, application servers 914. The application servers 914 are communicatively coupled to a database server 916, which facilitates access to a database 920 that stores data associated with messages processed by the application servers 914. Similarly, a web server 924 is coupled to the application servers 914, and provides web-based interfaces to the application servers 914. To this end, the web server 924 processes incoming network requests over the Hypertext Transfer Protocol (HTTP) and several other related protocols.

The Application Program Interface (API) server 910 receives and transmits message data (e.g., commands and message payloads) between the client device 826 and the application servers 914. Specifically, the Application Program Interface (API) server 910 provides a set of interfaces (e.g., routines and protocols) that can be called or queried by the messaging client 902 in order to invoke functionality of the application servers 914. The Application Program Interface (API) server 910 exposes various functions supported by the application servers 914, including account registration, login functionality, the sending of messages, via the application servers 914, from a particular messaging client 902 to another messaging client 902, the sending of media files (e.g., images or video) from a messaging client 902 to a messaging server 912, and for possible access by another messaging client 902, the settings of a collection of media data (e.g., story), the retrieval of a list of friends of a user of a client device 826, the retrieval of such collections, the retrieval of messages and content, the addition and deletion of entities (e.g., friends) to an entity graph (e.g., a social graph), the location of friends within a social graph, and opening an application event (e.g., relating to the messaging client 902).

The application servers 914 host a number of server applications and subsystems, including for example a messaging server 912, an image processing server 918, and a social network server 922. The messaging server 912 implements a number of message processing technologies and functions, particularly related to the aggregation and other processing of content (e.g., textual and multimedia content) included in messages received from multiple instances of the messaging client 902. As will be described in further detail, the text and media content from multiple sources may be aggregated into collections of content (e.g., called stories or galleries). These collections are then made available to the messaging client 902. Other processor and memory intensive processing of data may also be performed server-side by the messaging server 912, in view of the hardware requirements for such processing.

The application servers 914 also include an image processing server 918 that is dedicated to performing various image processing operations, typically with respect to images or video within the payload of a message sent from or received at the messaging server 912.

The social network server 922 supports various social networking functions and services and makes these functions and services available to the messaging server 912. To this end, the social network server 922 maintains and accesses an entity graph within the database 920. Examples of functions and services supported by the social network server 922 include the identification of other users of the messaging system 900 with which a particular user has relationships or is "following," and also the identification of other entities and interests of a particular user.

The messaging client 902 can notify a user of the client device 826, or other users related to such a user (e.g., "friends"), of activity taking place in shared or shareable sessions. For example, the messaging client 902 can provide participants in a conversation (e.g., a chat session) in the messaging client 902 with notifications relating to the current or recent use of a game by one or more members of a group of users. One or more users can be invited to join in an active session or to launch a new session. In some examples, shared sessions can provide a shared augmented reality experience in which multiple people can collaborate or participate.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an application specific integrated circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A machine-implemented method, comprising:
   capturing, by an Augmented Reality (AR) camera of an AR system, video frame data of a hand of a user;
   generating coordinate transformation data based on the video frame data, wherein the coordinate transformation data represents a location of the hand of the user in a 3D spherical coordinate system relative to a viewpoint of the user;
   generating camera steering command data based on the coordinate transformation data; and
   adjusting an optical axis of a steerable camera based on the camera steering command data to align the optical axis with the location of a skeletal model of the user's hand;
   wherein generating the camera steering command data comprises:
   determining a centroid of the skeletal model;
   projecting a ray from a viewpoint of the user to the centroid; and
   generating pitch and yaw adjustment commands based on azimuth and inclination angles of the ray.

2. The machine-implemented method of claim 1, wherein the steerable camera comprises:
   a camera having a sensor and a lens assembly; and
   one or more actuators linked to the camera.

3. The machine-implemented method of claim 1, wherein the steerable camera comprises:
   a stationary camera;
   a mirror; and
   one or more actuators linked to the mirror.

4. The machine-implemented method of claim 1, wherein the steerable camera comprises:
   a camera having a sensor and a lens assembly; and
   one or more configurable optical elements comprising Spatial Light Modulators (SLMs) that spatially modulate their phase.

5. The machine-implemented method of claim 1, wherein the AR camera and the steerable camera are the same camera.

6. The machine-implemented method of claim 1, wherein the AR system comprises a head-worn device.

7. A machine comprising:
   at least one processor; and
   at least one memory storing instructions that, when executed by the at least one processor, cause the machine to perform operations comprising:
   capturing, by an Augmented Reality (AR) camera of an AR system, video frame data of a hand of a user;
   generating coordinate transformation data based on the video frame data, wherein the coordinate transformation data represents a location of the hand of the user in a 3D spherical coordinate system relative to a viewpoint of the user;
   generating camera steering command data based on the coordinate transformation data; and
   adjusting an optical axis of a steerable camera based on the camera steering command data to align the optical axis with the location of a skeletal model of the user's hand;
   wherein generating the camera steering command data comprises:
   determining a centroid of the skeletal model;
   projecting a ray from a viewpoint of the user to the centroid; and
   generating pitch and yaw adjustment commands based on azimuth and inclination angles of the ray.

8. The machine of claim 7, wherein the steerable camera comprises:
   a camera having a sensor and a lens assembly; and
   one or more actuators linked to the camera.

9. The machine of claim 7, wherein the steerable camera comprises:
   a stationary camera;
   a mirror; and
   one or more actuators linked to the mirror.

10. The machine of claim 7, wherein the steerable camera comprises:
    a camera having a sensor and a lens assembly; and
    one or more configurable optical elements comprising Spatial Light Modulators (SLMs) that spatially modulate their phase.

11. The machine of claim 7, wherein the AR camera and the steerable camera are the same camera.

12. The machine of claim 7, wherein the AR system comprises a head-worn device.

13. A non-transitory computer-readable medium including instructions that, when executed by a machine, cause the machine to perform operations comprising:
- capturing, by an Augmented Reality (AR) camera of an AR system, video frame data of a hand of a user;
- generating coordinate transformation data based on the video frame data, wherein the coordinate transformation data represents a location of the hand of the user in a 3D spherical coordinate system relative to a viewpoint of the user;
- generating camera steering command data based on the coordinate transformation data; and
- adjusting an optical axis of a steerable camera based on the camera steering command data to align the optical axis with the location of a skeletal model of the user's hand;
- wherein generating the camera steering command data comprises:
  - determining a centroid of the skeletal model;
  - projecting a ray from a viewpoint of the user to the centroid; and
  - generating pitch and yaw adjustment commands based on azimuth and inclination angles of the ray.

14. The non-transitory computer-readable medium of claim 13, wherein the steerable camera comprises:
- a camera having a sensor and a lens assembly; and
- one or more actuators linked to the camera.

15. The non-transitory computer-readable medium of claim 13, wherein the steerable camera comprises:
- a stationary camera;
- a mirror; and
- one or more actuators linked to the mirror.

16. The non-transitory computer-readable medium of claim 13, wherein the steerable camera comprises:
- a camera having a sensor and a lens assembly; and
- one or more configurable optical elements comprising Spatial Light Modulators (SLMs) that spatially modulate their phase.

17. The non-transitory computer-readable medium of claim 13, wherein the AR camera and the steerable camera are the same camera.

* * * * *